2,918,405
Patented Dec. 22, 1959

2,918,405

THERAPEUTIC COMPOSITIONS CONTAINING HEAT-TREATED ATTAPULGITE

Martin Barr, Philadelphia, and Anthony L. Monaco, Norristown, Pa., assignors to American Home Products Corporation, New York, N.Y., a corporation of Delaware No Drawing. Application February 11, 1957
Serial No. 639,183

10 Claims. (Cl. 167—65)

This invention relates to therapeutic compositions intended for internal use which contain heat-treated Attapulgus clay as an adsorptive agent. More particularly, our invention is concerned with therapeutic compositions which contain attapulgite clay, which has been subjected to heat treatment as an ingredient replacing the kaolin which is frequently present in these medicinal or therapeutic suspensions having effective adsorptive action. By heat-treated Attapulgus clay is meant that modified form of the naturally occurring clay product which, previous to its incorporation in the medicinal or therapeutic suspension, has been subjected to heating at a temperature within the range 250–900° F. for a period of time ranging from 15 to 30 minutes.

Attapulgus clay, the naturally occurring material, is considered to be a distinct clay mineral which has, as its main constituent, a hydrous magnesium aluminum silicate. De Lapparent has suggested for this hydrous magnesium aluminum silicate the empirical formula: $(OH)_2H_2Al_{4/3}Mg_2Si_3H_4O_{10}$. X-ray diffraction data and differential thermal analysis curves give definite support to the conclusion that attapulgite is a distinct species, distinguished from mica, montmorillonite and other clay minerals.

Attapulgite particles have a lath-like character with long double chains of composition $Si_4O_{11}$ running parallel to the fibre axis. The double chains of $Si_4O_{11}$ are joined by magnesium and calcium, as well as through shared oxygen atoms. A complete planar sheet of oxygen atoms is thus produced, arranged exactly as in the micas and other clay minerals. However, as contrasted with the micas, the silicon atoms in attapulgite form long strips alternately on the two sides of the oxygen sheet. The magnesium-aluminum-oxygen units are also placed in strips parallel to the fibre axis. Channels which have a free cross-section of 3.7 to 6.0 Angstrom units, i.e. large enough to admit molecules of considerable size, run parallel to the fibre axis. These channels, however, have no interconnections of comparable size. In the natural Attapulgus clay loosely-retained water molecules occupy a considerable part of this space. On dehydration of the attapulgite by heating at moderate temperatures such as those which are utilized in the preparation of heat-treated attapulgite which we incorporate in therapeutic compositions, water molecules present in the raw clay material are removed, but the structure of the mineral remains substantially intact.

Attapulgus clay is hygroscopic and is readily dispersed in water. The naturally occurring clay has marked adsorptive properties, which are, however, usually enhanced by thermal activation such as by heating within the range 250–900° F., for a period of time ranging from 15 to 30 minutes. Particles of attapulgite have a diameter of from 10 to 50 millimicrons and a surface area calculated as 150 square meters per gram, this latter figure giving an index as to the high adsorptive properties of the mineral. The superior adsorptive properties of attapulgite are attributed to its needle-like crystal structure and the very porous character of its crystal lattice. In contrast, kaolin occurs as scales or plates, either rhombic or hexagonal, which are non-porous and therefore possess less surface area on an equal weight basis.

In addition to attapulgite, Attapulgus clay as commercially supplied contains some free silica, calcite and iron minerals. Spectrographic analysis shows traces of manganese, nickel, chromium, zinc, copper, lead, tin, vanadium and silver.

While Attapulgus clay, being a natural product, may vary to some extent in chemical composition depending on the source and other factors, the chemical composition of a typical attapulgite may be illustrated by the following summary giving compositions of three commercially-available clays.

TABLE I

| Constituent | Percentage | | |
|---|---|---|---|
| | Composition A | Composition B | Composition C |
| $Al_2O_3$ | 12.5 | 9.83 | 10.06 |
| CaO | 2.5 | 1.69 | 1.29 |
| FeO | | 0.19 | 0.18 |
| $Fe_2O_3$ | 4.0 | 3.52 | 3.40 |
| MgO | 11.0 | 9.87 | 9.16 |
| $SiO_2$ | 67.0 | 54.04 | 53.42 |
| MnO | | | 0.02 |
| $Na_2O$ | | 0.08 | 0.02 |
| $K_2O$ | | 0.57 | 0.64 |
| $TiO_2$ | | 0.32 | 9.52 |
| $P_2O_5$ | | | 0.12 |
| Water and miscellaneous constituents | 3.0 | Balance | Balance |

Many therapeutic compositions intended for internal use, usually termed intestinal adsorbent compositions, are characterized by the presence therein of an adsorptive clay as one of the adsorptive agents. In the past it has been customary to utilize kaolin as the clay. Kaolin, which is included in the most recent edition of the National Formulary, has important adsorptive properties for bacterial toxins and other poisons. But therapeutic compositions containing the usual ingredients including, however, the hydrous magnesium aluminum silicate, Attapulgus clay, which has previously been subjected to heating at a temperature within the range 250–900° F. for a period of time ranging from 15 to 30 minutes in place of the kaolin, in accordance with our invention, will exhibit much superior adsorptive activity.

Compositions containing an adsorptive and, generally, an alkaline agent such as alumina gel, are frequently administered internally for combating bacterial infections. They are particularly effective for adsorbing toxins produced in the patient's stomach and intestines by bacteria. They are also effective as adsorbents for other toxic substances which find their way into the human gastroenteric tract, whether produced by food decomposition, or otherwise. Among microorganisms that are frequently causative agents in infections of the gastrointestinal tract and whose toxins are adsorbed when these pharmacological preparations containing clay are taken internally may be mentioned the following: *Staphylococcus aureus, Proteus morganii, Proteus vulgaris, Salmonella typhimurium, Salmonella enteritidis, Salmonella montevideo, Shigella dysenteriae, Shigella paradysenteriae, Shigella alkalescens,* and *Shigella dispar.*

Therapeutic compositions of this general type frequently contain other active ingredients, such as one or more of the antibiotics. One or more antispasmodic agents, which are especially beneficial in preparations intended to be effective in the gastrointestinal tract, are also frequently present. These therapeutic compositions often contain other active ingredients in addition, such as pectin, inorganic silicates such as the product sold commercially under the trademark name "Veegum," etc., as well as sweetening, flavoring and coloring agents, preservatives, and other ingredients. ("Veegum" is purified colloidal magnesium aluminum silicate effective as a suspending and emulsifying agent which is sold under this trademark by R. T. Vanderbilt Co. of 230 Park Avenue, New York, N.Y.)

Specific compositions of this type which contain heat-treated Attapulgus clay as the primary adsorptive agent, and which are intended to be taken into the gastrointestinal tract for the purpose of adsorbing toxins and other toxic products which may be present therein, are subsequently described.

We have discovered that if Attapulgus clay which has been subjected to heat-treatment at a temperature within the range 250–900° F. for a period of time ranging from 15 to 30 minutes is used in place of the usual kaolin constituent of these therapeutic preparations, the adsorptive properties are greatly increased. Our invention is therefore directed to the utilization as the clay ingredient, in place of the usual kaolin, of one or more forms of the naturally occurring hydrous magnesium aluminum silicates known as attapulgite, which has previously been subjected to heat-treatment within the temperature range specified for a period of time ranging from 15 to 30 minutes.

One of the commercially-available attapulgites that has been found especially suitable for use in our improved therapeutic compositions intended for internal use is supplied by Minerals and Chemicals Corporation of America under the trademark name "Attasorb." This product, which is prepared by a heat treatment which involves heating the clay to a temperature within the range 250–900° F. for a period of time ranging from 15 to 30 minutes utilizes as the Attapulgus clay a product which has been mined in southwest Georgia and northern Florida and which is generally known in the trade as the Georgia-Florida fuller's earth. This is extremely fine in texture, the product being of such fineness that 90–95% is of particle size less than 10 microns. It is supplied commercially in three grades, known as "Attasorb" HVM, "Attasorb" RVM, and "Attasorb" LVM. These grades differ from each other chiefly in their residual free moisture contents.

For example, that grade of "Attasorb" heat-treated Attapulgus clay product known as "Attasorb" LVM is prepared by activating the attapulgite by heating within the temperature range 700° F. to 900° F. The grade known as "Attasorb" RVM is prepared by heating within the temperature range 400° F. to 700° F. That known as "Attasorb" HVM is prepared by heating within the range 250° F. to 350° F. The duration of the heating period, in each instance, may vary somewhat, but in all cases it is between 15 minutes and 30 minutes after the charge of Attapulgus clay being heated has reached a temperature within the indicated range.

When heating Attappugus clay within the temperature range 250° F.–350° F., employed in the preparation of "Attasorb" HVM, destruction of the colloidal properties of the mineral occurs at these temperatures. Attapulgite activated by heating within this temperature range exhibits the greatest dispersibility in water. While adsorptive properties are somewhat less than the maximum characteristic of the other grades of "Attasorb," i.e. heat-treated Attapulgus clay, the difference appears to have no practical significance.

"Attasorb" RVM, prepared by heat treatment of the Attapulgus clay within the temperature range 400° F. to 700° F. exhibits optimum adsorption characteristics. Its water-dispersibility is less than that of "Attasorb" HVM.

The grade of the heat-treated product known as "Attasorb" LVM is characterized by adsorption properties somewhat less than the maximum obtainable. Its water-dispersibility is less than that of the other two grades.

As illustrative of the water content of these three products, after completion of the activation by heating, within the specified temperature ranges, the following percentages are typical:

TABLE II

| Product and Temperature of Activation | Retained water Content, percent |
| --- | --- |
| "Attasorb" LVM—700° F. to 900° F | 2.0 to 6.0 |
| "Attasorb" RVM—400° F. to 700° F | 6.0–10.0 |
| "Attasorb" HVM—250° F. to 350° F | 10.0–12.0 |

When incorporated in therapeutic compositions, especially intestinal adsorbent compositions, in accordance with our invention, all three grades of heat-treated Attapulgus clay, "Attasorb" LVM, "Attasorb" RVM, and "Attasorb" HVM, will give improved products exhibiting properties much superior to those of the usual types of these compositions containing kaolin as the adsorbent clay. However, where dispersibility in aqueous systems is of importance, superior activity will be secured when the therapeutic compositions contain either the HVM or the RVM grades of the "Attasorb" heat-treated Attapulgus clay product.

The thermal treatment of the attapulgite removes the water from the channels previously described, thereby increasing the effective surface area and augmenting the adsorptive capacity. The particle sizes of the three grades of "Attasorb" vary within the range 0.3–3.0 microns, but this has no practical significance with respect to adsorption.

A typical chemical composition on the volatile-free basis of "Attasorb" heat-treated Attapulgus fuller's earth as supplied by Minerals and Chemical Corporation of America, whether the LVM, RVM or HVM grades, follows. The percentages specified are by weight.

TABLE III

*Typical composition*

| | Percent |
| --- | --- |
| $SiO_2$ | 67.0 |
| $Al_2O_3$ | 12.5 |
| MgO | 11.0 |
| $Fe_2O_3$ | 4.0 |
| CaO | 2.5 |
| $K_2O$ | 0.6 |
| $TiO_2$ | 0.5 |
| Miscellaneous | 1.9 |

It may be remarked that the form of heat-treated Attapulgite clay commercially available and sold as "Attasorb" is particularly suitable, in that its use results in a pharmaceutical product of superior elegance, since "Attasorb" is a dry, light-colored material of extreme fineness, and of a character such that its dispersions are free from the presence of objectionable gritty constituents.

By means of comparative experiments it can be readily demonstrated that a heat-treated attapulgite (as, for example, one of the "Attasorb" products of Minerals and Chemicals Corporation of America) which has been heated within the temperature range of 250° F.–900° F. for a period of time ranging from 15 to 30 minutes, thereby driving out a large proportion of the water and other volatile constituents, will adsorb in a given period of time about four to five times as much of a typical toxin as will kaolin.

The therapeutic compositions intended for internal use, particularly for use in the gastrointestinal tract of human beings, in which we have observed that the use of heat-treated Attapulgus fuller's earth as the clay ingredient will greatly increase the adsorptive activity of the medicament for poisonous constituents which may be present in the stomach and gastrointestinal tract may also include various other active agents in addition to the heat-treated Attapulgus clay. Usually, in addition to the clay (now ordinarily kaolin), an antacid agent such as alumina gel, magnesium hydroxide or magnesium trisilicate will also be present. Compositions of this type are disclosed in Bird patent, No. 1,949,266. Pectin is frequently also present for its therapeutic activity, and suspending agents such as mineral oil or synthetic hydrated aluminum silicate (e.g. "Veegum" of Vanderbilt Company) are frequently present. Antibiotics, especially streptomycin (or dihydrostreptomycin), polymyxin and neomycin, are usual constituents of these intestinal adsorbent compositions. One or more of those therapeutic agents having antispasmodic activity may also be incorporated. Preservatives, such as sodium benzoate, sodium propionate, sorbic acid, one or more of the parabens, etc. are also usual constituents. The parabens are salts of the alkyl esters of p-hydroxybenzoic acid.

In all compositions it has been found that the use of heat-treated attapulgite as the clay constituent will provide a very satisfactory medicament of greatly improved therapeutic properties, having adsorptive properties greatly exceeding those of the same composition containing kaolin N.F. in place of the attapulgite. Moreover, the use of heat-treated attapulgite, such as any of those grades sold under the trademark name "Attasorb," has been found to impart greater smoothness and stability to the medicinal suspension.

Ordinarily the effective range for the heat-treated attapulgite content of the improved internal therapeutic preparations with which this invention is concerned will vary from attapulgite percentages of from 0.5 percent to 17.0 percent by weight, based on the total weight of the medicament. An amount of heat-treated attapulgite exceeding about 20 percent by weight is usually not desirable, since at this concentration of heat-treated attapulgite the therapeutic suspension begins to take on a semi-solid character and great difficulty in pouring is experienced. Within the specified range for heat-treated attapulgite content, however, it has been found that the use of this heat-treated clay product in place of kaolin N.F. imparts to the resulting medicinal suspension, on an equal weight basis, improved adsorptivity, both for toxins and alkaloids, to a truly remarkable degree.

The fact that heat-treated attapulgite also possesses valuable antacid properties to a degree not possessed by the usual kaolin N.F. used in these preparations is shown by the following experiment. In eight hours it was found that 10 grams of kaolin N.F. adsorbed 5 milliliters of 0.1 N hydrochloric acid, its pH being changed in the process from 7.6 to 3.0. At the end of the same period of time, on the other hand, 10 grams of heat-treated attapulgite consumed 83.5 milliliters of the same 0.1 N hydrochloric acid, the pH during the eight hour interval going from 7.9 to 4.0. The remarkable superiority of heat-treated attapulgite as an antacid is apparent.

The following are examples of typical intestinal adsorbent compositions prepared in accordance with our invention.

EXAMPLE 1

This intestinal adsorbent composition contained the antibiotic dihydrostreptomycin (or streptomycin) and polymyxin. The composition included the following ingredients, per 100 milliliters of therapeutic preparation:

| | | |
|---|---|---|
| Pectin | grams | 0.9 |
| Dihydrostreptomycin sulfate | do | 1.4709 |
| Polymyxin sulfate | do | 0.03077 |
| Heat-treated attapulgite | do | 10.0 |
| Alumina gel (2% Al$_2$O$_3$) | mls | 36.0 |
| Sodium benzoate | grams | 0.25 |
| Sodium propionate | do | 0.25 |
| Sorbic acid | do | 0.20 |
| Sodium hydroxide (or citric acid) enough to adjust to | pH | 5.5–6.5 |
| Sucrose | grams | 35.0 |
| D & C Red Color #33 | do | 0.002 |

Flavors—to taste.
Distilled water, enough to make 100 ml. of composition.

Sodium hydroxide solution or citric acid, depending upon the pH of the preparation as prepared without this basic or acidic constituent, is added to the preparation in amount sufficient to bring the pH within the range 5.5 to 6.5.

The use of heat-treated attapulgite (specifically "Attasorb" HVM) in this formula in place of the usual kaolin as the clay constituent was found to greatly increase its adsorptive properties for toxins.

EXAMPLE 2

The ingredients in this composition on a percentage basis (weight per volume) were as follows:

| | | |
|---|---|---|
| Dihydrostreptomycin sulfate | percent | 1.4709 |
| Polymyxin B sulfate, 6,500 µ/cc. | do | 0.03077 |
| Heat-treated attapulgite | do | 10.00 |
| Alumina gel | do | 36.0 |
| Pectin | do | 1.00 |
| "Veegum," plain | do | 0.75 |
| Sodium benzoate | do | 0.25 |
| Sodium propionate | do | 0.25 |
| Sorbic acid | do | 0.20 |
| Sodium hydroxide (or citric acid) enough to adjust to | pH | 5.5–6.5 |
| Sucrose | percent | 35.0 |
| D & C Red Color #33 | do | 0.002 |
| Imitation custard flavor | do | 0.011 |
| Imitation butter-vanilla flavor | do | 0.011 |
| Imitation raspberry flavor | do | 0.225 |
| Imitation cherry flavor | do | 0.150 |
| Imitation lime flavor | do | 0.0004 |
| Imitation pineapple flavor | do | 0.0004 |

Distilled water, enough to make 100 mls.

As compared with a similar composition containing kaolin N.F. in place of heat-treated attapulgite in the same proportionate content (10 percent on a weight per volume basis) our improved preparation containing heat-treated attapulgite ("Attasorb") showed greatly increased adsorptive properties for toxins.

EXAMPLE 3

An intestinal adsorbent composition containing heat-treated attapulgite, alumina gel and pectin (but no antibiotic) was prepared having the following composition:

| | | |
|---|---|---|
| Heat-treated attapulgite | percent | 10.0 |
| Alumina gel (2% Al$_2$O$_3$) | do | 36.0 |
| Pectin N.F. | do | 1.0 |
| "Veegum," plain | do | 0.85 |
| Sodium benzoate | do | 0.25 |
| Sodium propionate | do | 0.25 |
| Sorbic acid | do | 0.20 |
| Sodium hydroxide (or citric acid) enough to adjust | pH | 5.5–6.5 |
| Sucrose | percent | 35.0 |
| D & C Red Color #33 | do | 0.002 |
| Flavoring | do | 0.3978 |

Distilled water, enough to make 100 ml.

Percentages as given, are on a weight per volume basis.

As compared with the identical composition containing, however, the same percentage of kaolin in place of the heat-treated attapulgite clay, it was found that the adsorptive properties of the composition for diphtheria toxin had been increased approximately seven times by the use of the heat-treated attapulgite.

EXAMPLE 4

An intestinal adsorbent composition similar to that described in Example 3 was prepared, this preparation having the following composition:

| | | |
|---|---|---|
| Heat-treated attapulgite | percent | 10.0 |
| Alumina gel (2% $Al_2O_3$) | do | 36.0 |
| Pectin N.F. | do | 0.90 |
| Sodium benzoate | do | 0.363 |
| Mineral oil, heavy | do | 5.0 |
| Vanillin | do | 0.00834 |
| Benzoic acid | do | 0.222 |
| Glycerine | do | 1.35 |
| Saccharin | do | 0.00914 |

Water, enough to make 100 ml. of preparation.

All percentages are on a weight per volume basis.

When the same composition containing, however, 10.0 percent of kaolin N.F. in place of the heat-treated attapulgite was tested, it was found to have an adsorptive value for diphtheria toxin, per milliliter of preparation, equal to 250 units. The composition containing heat-treated attapulgite, on the other hand, showed adsorption for diphtheria toxin per milliliter of preparation equal to 1750 units. This seven-fold improvement in adsorptive properties for a typical bacterial toxin results from the use of the heat-treated attapulgite clay ("Attasorb" HVM) in the composition.

EXAMPLE 5

An intestinal adsorbent composition which contained both dihydrostreptomycin and polymyxin, as well as heat-treated attapulgite in place of the usual kaolin, was prepared to contain the following:

| | | |
|---|---|---|
| Dihydrostreptomycin base (as sulfate) | grams | 1.015 |
| Polymyxin B sulfate | units | 100,000 |
| Heat-treated attapulgite ("Attasorb" HVM) | grams | 10.0 |
| Pectin | do | 0.90 |
| Methyl paraben | do | 0.05 |
| Propyl paraben | do | 0.01 |
| Butyl paraben | do | 0.04 |
| Sucrose | do | 20.0 |

Color, q.s.
Flavor, q.s.
Distilled water, q.s. ad 100.0 ml.

It showed superior adsorbent action for toxins normally present in the human gastrointestinal tract.

EXAMPLE 6

This intestinal adsorbent composition contained the antispasmodic agent, ambutonium bromide, as well as the heat-treated attapulgite.

| | | |
|---|---|---|
| Dihydrostreptomycin base (as sulfate) | grams | 1.015 |
| Polymyxin B sulfate | units | 100,000 |
| Heat-treated attapulgite ("Attasorb" HVM) | grams | 10.0 |
| Pectin | do | 0.90 |
| Methyl paraben | do | 0.05 |
| Propyl paraben | do | 0.01 |
| Butyl paraben | do | 0.04 |
| Sucrose | do | 20.0 |

Color, q.s.
Flavor, q.s.

| | | |
|---|---|---|
| Ambutonium bromide | gram | 0.05 |

Distilled water, q.s. ad 100 ml.

Ambutonium bromide is an antispasmodic agent which is chemically identified as $\alpha,\alpha'$-diphenyl-$\gamma$-dimethylaminobutyramide ethobromide. See the article by Cheney et al. in Jour. Org. Chem., 17, pp. 770–777 (May 1952). Its antispasmodic activity is reported in the article by Judge et al., Journal of Laboratory and Clinical Medicine, 47, pp. 950–959 (June 1956).

This intestinal adsorbent composition could of course contain any other antispasmodic agent, although superior results were secured by the inclusion of ambutonium bromide. When taken internally, it exhibited outstanding adsorptive action for poisons present in the gastrointestinal tract.

EXAMPLE 7

This following intestinal adsorbent composition contained antacids, but no antibiotics. It is particularly effective as an antacid-adsorbent:

| | Grams |
|---|---|
| Heat-treated attapulgite ("Attasorb" HVM) | 2.0 |
| Pectin | 0.90 |
| Methyl paraben | 0.05 |
| Propyl paraben | 0.01 |
| Butyl paraben | 0.04 |

Color, q.s.
Flavor, q.s.

| | |
|---|---|
| Sodium benzoate | 0.50 |
| Magnesium hydroxide | 2.0 |
| Hydrated alumina powder (Wyeth) | 5.0 |

Distilled water, q.s. ad 100 ml.

EXAMPLE 8

Our improved intestinal adsorbent compositions may also contain an amoebacide in addition to the heat-treated attapulgite and other adsorptive agents. The following is an example of such a composition containing as the amoebacide bismuth glycolylarsanilate:

| | | |
|---|---|---|
| Dihydrostreptomycin base | grams | 1.015 |
| Bismuth glycolylarsanilate | do | 3.3818 |
| Heat-treated attapulgite ("Attasorb" HVM) | do | 10.000 |
| Pectin | do | 0.900 |
| Alumina gel (2% $Al_2O_3$) | ml | 36.000 |
| Methyl paraben | gram | 0.05 |
| Propyl paraben | do | 0.01 |
| Butyl paraben | do | 0.04 |
| Citric acid to adjust to | pH | 5.5–6.5 |

Flavor, q.s.
Color, q.s.
Distiller water, q.s. ad 100 ml.

When taken internally this composition exhibited superior adsorptive activity and the amoebacide was effective against microorganisms present in the gastrointestinal tract.

Various changes and modifications may be made in our invention, as herein described, without departing from the spirit and scope thereof. To the extent that such changes and modifications are within the scope of the appended claims, they are therefore to be regarded as part of our invention.

We claim:

1. An intestinal adsorbent composition which comprises alumina gel and at least 10 percent of attapulgite clay which has been subjected to heating at a temperature within the range 250–900° F. for a period of time ranging from 15 to 30 minutes.

2. An intestinal adsorbent composition which comprises at least 10 percent of attapulgite clay which has been subjected to heat treatment at a temperature within the range 250–900° F. for a period of time ranging from 15 to 30 minutes, alumina gel and pectin.

3. An intestinal adsorbent composition which comprises at least 10 percent of attapulgite clay which has been subjected to heating at a temperature within the range 250–900° F. for a period of time ranging from 15 to 30 minutes, alumina gel, pectin and at least one antibiotic selected from the group which consists of streptomycin, dihydrostreptomycin, polymyxin and neomycin.

4. An intestinal adsorbent composition which comprises at least 10 percent of attapulgite clay which has been subjected to heating at a temperature within the range 250–900° F. for a period of time ranging from 15 to 30 minutes, alumina gel, pectin, hydrated aluminum silicate and at least one antibiotic selected from the group which consists of streptomycin, dihydrostreptomycin, polymyxin and neomycin.

5. An intestinal adsorbent composition which comprises at least 10 percent of attapulgite which has been subjected to heating at a temperature within the range 250–900° F. for a period of time ranging from 15 to 30 minutes, pectin, dihydrostreptomycin, polymyxin and an antispasmodic agent.

6. An intestinal adsorbent composition comprising at least 10 percent of attapulgite which has been subjected to heating within the temperature range 250–900° F. for a period of time ranging from 15 to 30 minutes, pectin, dihydrostreptomycin, polymyxin and $\alpha,\alpha'$-diphenyl-$\gamma$-dimethylamino-butyramide ethobromide.

7. An intestinal adsorbent composition having improved adsorptive action for toxins and other poisons which comprises pectin, alumina gel, dihydrostreptomycin, polymyxin, and as an adsorbent clay from 10.0 percent to 17.0 percent by weight of attapulgite which has been subjected to heating within the temperature range 250–900° F. for a period of time ranging from 15 to 30 minutes.

8. An intestinal adsorbent composition having increased adsorptive action for bacterial toxins, said composition being in the form of a stable suspension and comprising approximately 36 percent by weight of alumina gel, approximately one percent by weight of pectin, and from 10.0 to 17.0 percent by weight of attapulgite which has been subjected to heat treatment within the temperature range 250–900° F. for a period of time ranging from 15 to 30 minutes, said composition also containing preservatives, sugar, flavoring and coloring agents, and water.

9. An intestinal adsorbent composition having improved adsorptive action for toxins and other poisons and which comprises pectin, alumina gel, dihydrostreptomycin, a amoebacide, and from 10.0 percent to 17.0 percent by weight of attapulgite which has been subjected to heating within the temperature range 250–900° F.

10. An intestinal adsorbent composition having improved adsorptive action for toxins and other poisons which comprises pectin, alumina gel, dihydrostreptomycin, bismuth glycolylarsanilate, and at least 10 percent of attapulgite which has been subjected to heat treatment at a temperature range within 250–900° F.

References Cited in the file of this patent

UNITED STATES PATENTS 1,949,266    Bird                 Feb. 27, 1944

OTHER REFERENCES

Drug Trade News, 26:21, page 65 Mfg. sec., October 15, 1951.

U.S. Dispensatory, 25th ed., pp. 56–58, 616–617, 734–736, 885, 1085.

Reg. U.S. Trade Mark 561,218, July 8, 1952 (for low volatile fuller's earth).

Judge et al.: J. Lab. and Chem. Med., 47, pp. 950–959, June 1956.

UNITED STATES PATENT OFFICE

CERTIFICATE OF CORRECTION

Patent No. 2,918,405　　　　　　　　　　　　　December 22, 1959

Martin Barr et al.

It is hereby certified that error appears in the printed specification of the above numbered patent requiring correction and that the said Letters Patent should read as corrected below.

Column 4, line 49, left-hand side of Table III, seventh item thereof, for "TlO$_2$" read -- TiO$_2$ --; column 8, line 39, Example 8, for "Distiller" read -- Distilled --; column 10, lines 9 and 15, after "250-900° F.", each occurrence, insert -- for a period of time ranging from 15 to 30 minutes. --; same column 10, list of References Cited, under UNITED STATES PATENTS, the issue date, for "Feb. 27, 1944" read -- Feb. 27, 1934 --.

Signed and sealed this 19th day of July 1960.

(SEAL)
Attest:

KARL H. AXLINE
Attesting Officer

ROBERT C. WATSON
Commissioner of Patents